March 14, 1939.   I. V. BRUMBAUGH   2,150,819
GAS BURNER
Filed July 21, 1936   2 Sheets-Sheet 2
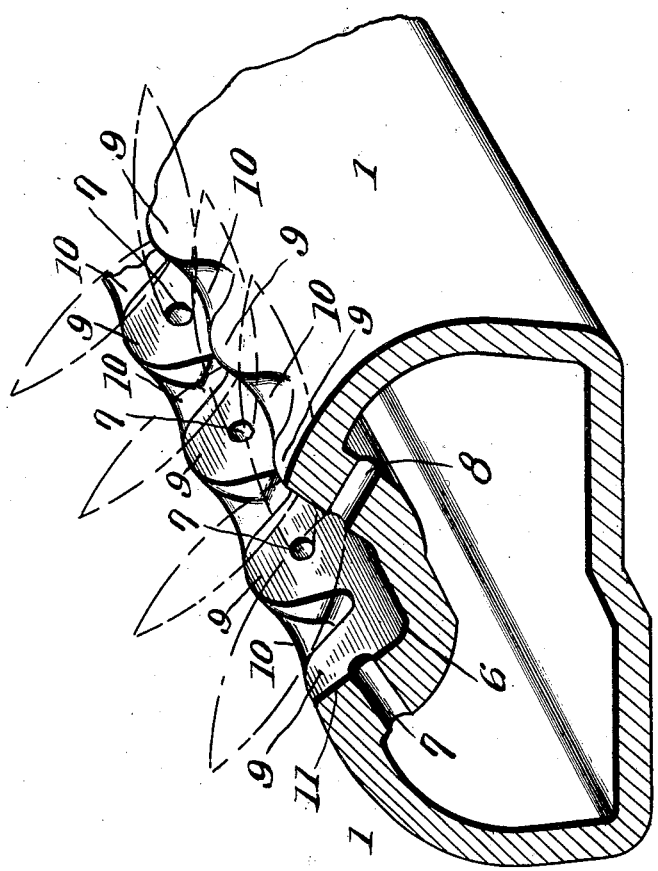
Inventor
I. V. Brumbaugh
By Patterson, Wright & Patterson
Attorneys Patented Mar. 14, 1939

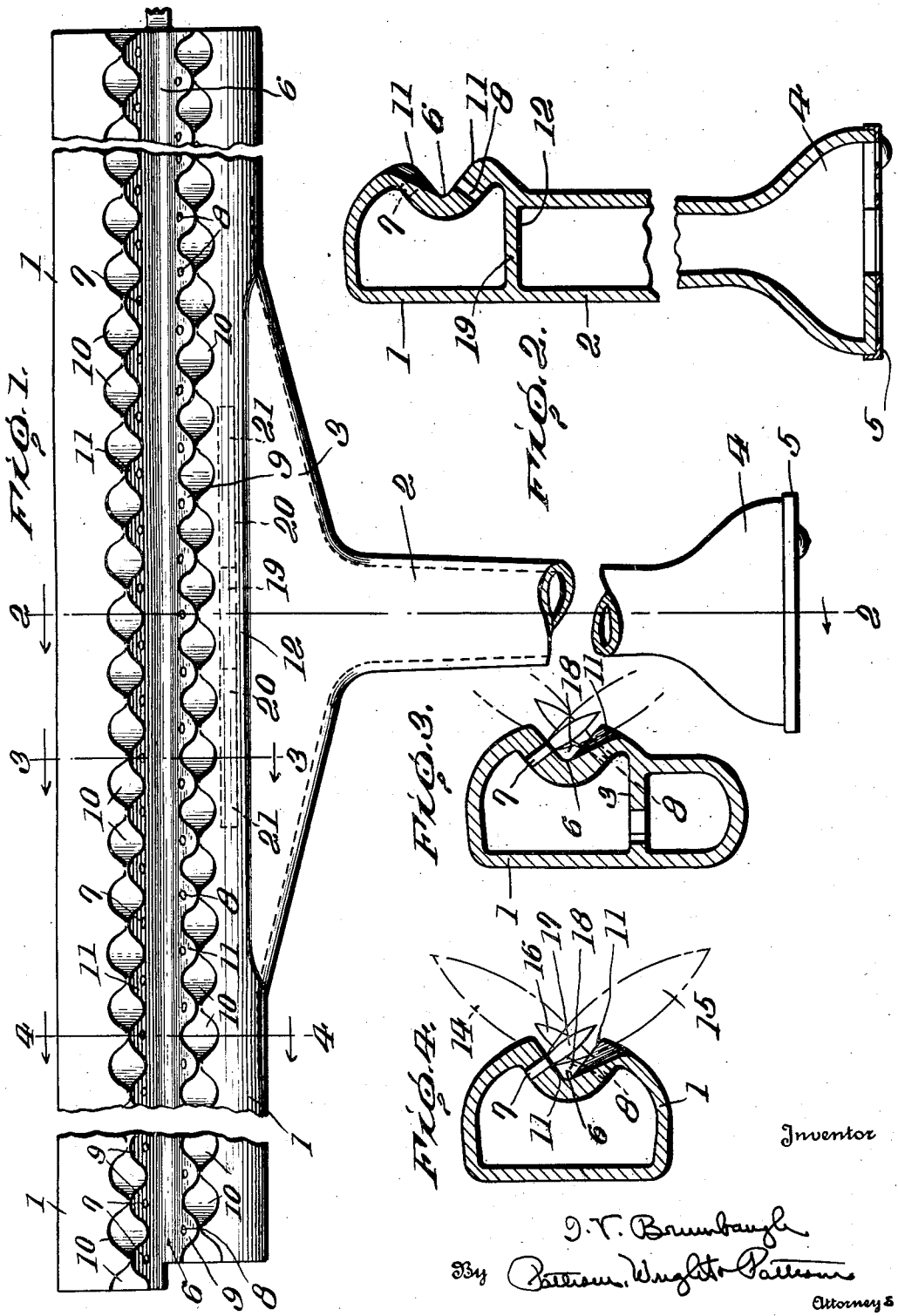

2,150,819

UNITED STATES PATENT OFFICE 2,150,819

GAS BURNER

Isaac Vernon Brumbaugh, St. Louis, Mo., assignor to American Stove Company, St. Louis, Mo., a corporation of New Jersey Application July 21, 1936, Serial No. 91,762

7 Claims. (Cl. 158—104)

This invention relates to a novel gas burner, which is so constructed that it accomplishes the functions and purposes hereinafter pointed out.

This improved burner is especially constructed for the heating of ovens both insulated and uninsulated, though it is adapted to be used in the place of other burners for general cooking and other heating purposes.

One object of this improved burner is to greatly exceed the oven heating requirements of the American Gas Association that requires ovens to be heated to 500° F., in 20 minutes, and secondly, that a constant low temperature far below 320° F. (American Gas Association minimum temperature requirement) is maintained within the oven.

It has been a problem to obtain a constant low oven temperature in well known insulated ovens, with which to do satisfactorily low oven temperature cooking, mainly because the same burner is used to attain the high temperatures, as well as the said low temperatures, and it is a further object of this invention to accomplish these results.

Further, it is known that it requires substantially the same amount of heat to heat up an insulated oven as is required to heat up an oven that is not insulated. It is further known that it requires about one-half as much gas to maintain a given temperature in an insulated oven as is required to maintain the same temperature in an uninsulated oven, when all other things are substantially equal.

Other objects of the invention are accomplished by constructing the burner in the manner hereinafter shown and described, whereby certain improved results are obtained.

Referring now to the drawings,

Figure 1 is a top plan view of a burner which involves said invention;

Figure 2 is a cross-section of the burner taken on the line 2—2 looking in the direction indicated by arrows;

Figure 3 is a cross-section of Figure 1, on the dotted line 3—3 of Figure 1, also looking in the direction indicated by arrows;

Figure 4 is a cross-section on the dotted line 4—4 of Figure 1, looking in the direction indicated by arrows;

Figure 5 is a sectional perspective view of a burner shown in Figure 1.

Referring now to the drawings, in which like parts are indicated by similar reference numbers, 1 is the burner generally speaking. In Figure 1 the burner is shown in top plan view and it consists of an elongated body portion which, as shown in Figures 2, 3 and 4, is hollow. A mixing tube 2 has its inner end enlarged laterally as at 3 and this enlargement is made as a part of the body portion 1. Gas is fed as is usual to the bell-shaped inlet end 4 of the mixing tube 2, said bell-shaped end having the usual shutter 5 for regulating the amount of primary air which is fed to the mixing tube and the gas and air mixes in this tube and is fed to the enlargement 3 and from the enlargement into the body portion 1 of the burner.

As shown in the drawings, this body portion has a longitudinally extending depression 6 which is substantially V-shaped, which extends throughout the length of the body portion 2. The said walls of the body portion are provided with a plurality of gas passages 7 and 8. The gas passages 7 extend at an angle to the said passages 8, whereby the gas flows from the said openings in opposite directions. The V-shaped depression 6 has its side walls formed at outwardly extending angles, the said wall at one side of the depression extends outward in one direction and the side wall at the opposite side of the depression extends at an angle in the opposite direction, thus forming the V-shaped depression 6. Between the passages 7 and 8 the burner is provided with the depressions 10 which may be aptly termed scallops. The object and function of these indentations 10 will be explained hereinafter. It will be observed that the said gas passages 7 and 8 are made through the flat walls 11.

A baffle 12 is located in the body portion of the burner, as shown in Figures 1, 2 and 3. This baffle thus spans a part of the enlargement 3 at the inner end of the mixing tube 2 for a purpose which will be described hereinafter.

Referring now to Figures 3 and 4, attention is directed to the cross-flames 14 and 15. It will be observed that the gas passes through the openings 7 and 8 and the flames extend in opposite directions forming a cross. For the purpose of convenience, these flames will be referred to as "cross" flames, and these flames may also be referred to as forming a V.

In Figure 4 particularly the flame is shown with dark and very much shorter inner cones 16 and 17, which mean to convey the idea that gas flames usually possess these rather distinct inner cone portions.

Attention is called to Figure 1, in that the ports or passages 7 and 8 are spaced sufficiently near each other to cause the flames to make a cross-fire or V flame. These ports are placed so near to each other that one flame impinges the adjacent edges or side-swipes the opposite adjacent flames and that the said ports on opposite sides of the V-shaped portion of the burner are out of line with each other, whereby the side-swiping occurs. The object of this impinging or side-swiping of the flames, near their bases, is to cause one flame to retard the other flame and cause the flames to be held to the said ports, as will be more fully explained further on and the object of having the flames burn separately beyond the region of the impingement thereof is to subject a greater surface of the flames to the surrounding secondary air and to thereby cause a more rapid combustion to occur and as a consequence greater heat to be generated by said flames.

The expression "obtuse angle" used in the claims is to be understood as meaning that the impingement is sufficiently near the bases of the flames to hold them to the ports for the purpose herein specified, and to cause the flames to burn separately from one another beyond said point.

The object of the scallops is to provide secondary air spaces for the flames and allow them to burn freely without impingement which otherwise would occur unless the scallops were provided. Attention is further called to the fact that there is a space below the flames (see Figure 4) and this space also forms a passage for secondary air below the said flame, thus assisting the burning thereof.

To maintain a constant low temperature of about 320° F. in an insulated oven of the average size requires about 3000 B. t. u. per hour. This means that a burner having about 125 ports will consume gas at the approximate rate of only 25 B. t. u. per port when the oven is being maintained at a constant low temperature. If the gas is regulated so that it is reduced appreciably less than 25 B. t. u. per hour per port, then there is not enough gas flowing to each port to maintain continuous combustion and the flame may flicker off and on or burn continuously at only a few ports, dependent on the rate of flow of the gas. This means that the gas which is not being burned will be escaping, which is undesirable because of the odor that results.

It, therefore, follows, that in order to obtain the lower oven temperature and satisfactory combustion, the burner must have an appreciably less number of ports, or the oven must be made less efficient, which, of course, is not desirable.

In addition to the low oven temperature problem, there is a great demand for ovens to be heated up much more rapidly in order to conserve the time of the user of the range and also to obtain an advantage over other kinds of heat.

In constructing the above burner, I have devised a new type with which I am able to obtain extremely fast heating of an oven and also a much lower minimum oven temperature. The normal rating of this burner is between 28,000 and 35,000 B. t. u. per hour. This means that when the flow of gas is turned on full to the burner, it is capable of consuming as much as 500 B. t. u. per hour per port and produce a very satisfactory flame. With this new design of burner, having about 70 ports, I can also maintain a constant temperature in the average insulated oven of domestic gas ranges from about 200° F. to 225° F., depending upon the temperature of the room.

Natural gas is one of the most difficult gases to burn, because of slow combustion. This means that the air shutter cannot be opened fully with the average burner when operated under normal gas pressure conditions, otherwise the flame will blow from the ports. The new cross-fire burner can be operated with the air shutter wide open with normal gas pressure. This fact I have obtained by tests which can be stated if desired.

The above is accomplished by the angle at which the ports are drilled and their special spacing relative to one another. It is the crossing of the flames between one another that causes the flames to hold to the ports. In other words, there is impinging or "side-swiping" of the adjacent edges of flames near their base.

Tests with a primary-air measuring apparatus, such as shown and described in Bureau of Standards Technologic Papers No. 193, "Design of Atmospheric Gas Burners", show that natural gas flames will blow from the ports of the ordinary burner having ports of No. 34 drill size when the gas consumption is about 400 B. t. u. per burner port and the primary air mixed with the gas is about 40.0% of that required for complete combustion of the gas. I find that with my cross-fire burner, about 55.0% of the air required for combustion of natural gas can be mixed with the gas as primary air under the same conditions without causing the flames to blow from the ports. In other words, the cross-fire burner will operate satisfactorily (that is, natural gas flames will not blow from the ports) with about 35.0% greater primary air entrainment than is possible with the conventional type of burner.

This burner is quite different in operation and result when compared with the ordinary burner. The flame has more "life" to it; the individual flames are better aerated. The rate of combustion of the gas per burner port is appreciably increased with normal gas conditions owing to the arrangement of the ports. That this cross-fire burner will operate satisfactorily with an appreciably higher primary air injection than the ordinary burner and, therefore, it can be adjusted to consume gas at a higher rate than the ordinary burner, because of the more intense combustion of which the burner is capable.

I realize that numerous patents have been issued for burners which are provided with ports that are drilled at various angles. However, it will be found that these patents show that the gas from one port is directed towards the gas of another port, thus producing a single flame, whereas in my burner the flames stand individually and they impinge or side-swipe and for these reasons produce a much hotter flame and the burning of my cross-burner flames are very different from the flames of other burners known to me that are provided with ports at various angles.

While my burner here shown is an elongated straight line, yet I wish it to be understood that this may be varied and that my burner may be made circular or round or any other shape that is best for the purpose for which it is to be used, so long as the cross flames and the impinging or side swiping of the flames are present.

The object of the depression 10, located at opposite sides of the ports 7 and 8 is to provide spaces for the secondary air to flow into the V-shaped portion 6 between the said ports and the straight portions 11, whereby sufficient air is provided under the flames at the point 18 for their free burning.

The object of the shield 12 is to cause the mixed air and gas flowing from the inlet end of the mixing tube 2 to be interrupted as the mixture flows to the burner. This shield 12 is made preferably of the form shown in Figure 6, which has a solid portion 19 at its center and is provided with tapered portions 20 on opposite sides of the center portion 19, which enlarge outwardly and connect with the enlarged portions 21. I find that by the use of a shield which operates substantially like the shield here shown that the gas mixture in the body portion is maintained at substantially the same pressure throughout, whereby the gas flows to the passages 7 and 8 at substantially uniform pressures whereby the flames 14 and 15 throughout the burner are substantially uniform. This uniform pressure in the body portion 1 is aided by the fact that the outlet end of the mixing tube 2 has the enlarged portion 3, which causes the mixture through the tube to be greatly expanded in the portion 3, which together with the shield 12 accomplishes a uniformity of pressure throughout the body portion 1.

I have accomplished, among other results with my burner, the following: greatly increased speed in the heating of the oven; I am enabled to obtain a much lower minimum of temperatures for the oven and maintain individual flames from each port, thus avoiding the escape of any unburnt gases; I am enabled to cause the flames to quickly spread from port to port at any rate of combustion of gas from full-on flame to a minimum flame without the disadvantages herein before pointed out and I accomplish by my burner much better combustion of the gas.

I claim:

1. An article of manufacture comprising a gas burner having a hollow body portion provided with a depressed portion in its top thus forming two opposite walls, gas ports passing through the said walls and the gas ports of one wall extending towards the opposite wall and open-ended depressions formed crosswise in the said walls at points between the gas ports, the gas ports being out of line with each other crosswise the said body portion, the parts combined for the purpose set forth.

2. A new article of manufacture, comprising a burner having an elongated hollow body portion provided with substantially an elongated depressed portion, a plurality of gas ports in opposite side walls of the depressed portion, said gas ports in one side arranged in staggered relation with the gas ports in the other side wall, said gas ports extending in opposite inclinations to form cross flames, and said gas ports causing the flames from one side wall of said depressed portion to impinge the adjacent side edges of each other at substantially an obtuse angle with the points of contact substantially near their bases thereby holding the flames to said ports to prevent the blowing or flickering of the flames from said ports when the gas is fed at different pressures, thereby maintaining steady flames at said ports as described.

3. A new article of manufacture comprising a hollow body portion provided with a centrally arranged depressed portion in its top thus forming parallel opposite side walls, gas ports passing through the side walls, said ports arranged to stagger with each other, and said walls having cross depressions arranged between the said ports and in staggered relation, said depressions having their inner ends communicating with said central depression and the outer open ends passing through said walls and communicating outside of the said body depression whereby the cross streams of air are fed to the central depressions to assist in maintaining the flames from said ports and to prevent the flames from one side wall impinging on the opposite side wall of the body depression, combined substantially as described.

4. A new article of manufacture, comprising a burner having a hollow body portion provided with a centrally arranged depression thus forming parallel oppositely extending side walls, each side wall provided with a plurality of upwardly inclined oppositely extending gas ports, said ports of the opposite sides arranged in staggering relation to form cross-flames, the ports of one wall extending sufficiently near the adjacent port of the opposite wall to cause the impingement of the edges of said flames which retards the said flames and holds them down adjacent the said ports, said impingement being substantially near the bases of the flames with the axes of the flames projected onto a plane parallel to said flames forming substantially an obtuse angle for the purpose described.

5. A new article of manufacture, comprising a gas burner composed of a hollow body portion having a centrally and longitudinally extending depression thus forming opposite extending side walls, gas ports in the said side walls feeding gas in upwardly and inwardly oppositely extending flames to form cross-flames, said ports arranged in staggering relation, and each side wall having open-ended depressions passing therethrough and having their inner ends communicating with the said central depression and their outer ends communicating with the outside of the said body portion, thus constituting each wall with scallops between the said ports of each wall, said scallops of one wall being in staggered relation with the scallops of the opposite wall whereby the said burner operates with the improved results set forth herein.

6. An improved gas burner comprising a hollow body portion having a groove therein with its opposite walls provided with parallel rows of gas ports, the axes of the ports of said rows extending in opposite angular directions crosswise the body portion, the ports of one row staggered in respect to the ports of the other row, the ports being so spaced and the angular inclination of said axes being such that the flames burned at said ports cross one another and have impingement with one another only at their proximate edges adjacent their bases and form individual flames beyond said points of impingement.

7. An improved gas burner comprising a hollow body provided with a pair of parallel rows of gas ports, the ports of one row staggered in respect to the ports of the other row, the axes of opposite ports extending at an angle toward each other across said body, the angle of inclination and spacing being such that opposite ports form cross flames impinging with one another only at their adjacent edges with individual flames extending beyond the points of impingement and the points of impingement forming a continuous flame located between the outer ends of the ports and the beginning of said individual flames, said continuous impinging flames holding the flames to said ports.

ISAAC VERNON BRUMBAUGH.